United States Patent [19]
Pryor et al.

[11] 4,319,921
[45] Mar. 16, 1982

[54] HEAT RECOVERY AND MELTING SYSTEM FOR SCRAP METALS

[75] Inventors: Jerry C. Pryor, Charleston Heights, S.C.; Roger E. Jenson, Sterling, N.Y.

[73] Assignee: The Celotex Corporation, Tampa, Fla.

[21] Appl. No.: 198,339

[22] Filed: Oct. 20, 1980

[51] Int. Cl.³ .............................................. C22B 21/00
[52] U.S. Cl. ..................... 75/65 R; 75/68 R; 266/156; 266/207; 266/901
[58] Field of Search .............. 75/43, 44 RS, 65, 68 R, 75/65 R, 156, 207, 901; 266/901, 156, 207

[56] References Cited
U.S. PATENT DOCUMENTS

| | | | |
|---|---|---|---|
| 3,869,112 | 3/1975 | Habayeb | 266/901 X |
| 3,933,343 | 1/1976 | Rawlings | 266/901 X |
| 4,010,935 | 3/1977 | Stephens | 266/901 X |
| 4,055,334 | 10/1977 | Stephens | 266/901 X |
| 4,060,408 | 11/1977 | Kuhn | 75/65 X |

Primary Examiner—M. J. Andrews
Attorney, Agent, or Firm—James W. Grace; Charles W. Vanecek

[57] ABSTRACT

Metallic scrap contaminated with combustibles is melted in a reverberatory melting furnace having two communicating wells; one being an enclosed sidewell, which is the receiving well for scrap material during melting, and the other being an enclosed main holding well for molten metal. The main well has burner means to provide heat for melting the metal and treating the scrap material. Heat from molten metal flowing between the main well and the sidewell produces exhaust gases by vaporizing the combustibles of the scrap material. An external passage circulates the exhaust gases from the sidewell to the main well for incineration by the main well's burner means. The external passage has an eductor means which draws the exhaust gases from the sidewell and propels them towards the main well.

16 Claims, 6 Drawing Figures

HEAT RECOVERY AND MELTING SYSTEM FOR SCRAP METALS

BACKGROUND OF THE INVENTION

1. Field of The Invention

This invention relates to a furnace for melting metal and more particularly to an improved reverberatory furnace for melting aluminum scrap and a process for use therewith.

2. Description of the Prior Art

In the refining of metals, a fuel fired furnace is supplied with the solid metal to be melted. It is economically desirable to charge the furnace with scrap metal in order to recover the metal from the scrap materials. However, the use of metal scrap has certain drawbacks in that the scrap is normally contaminated with combustibles, particularly hydrocarbons, such as oil, paint, grease and the like, and the contaminating material will be volatilized when the metal is heated and will pass off from the metal as an undesirable atmospheric pollutant.

It is important that any system devised to deal with the volatile emissions should avoid, as much as possible, oxidation of the metal, which would decrease recovery. Metal lost to oxidation contributes significantly to the cost in converting the solid metal to molten metal. The approach disclosed in U.S. Pat. No. 3,933,343 provides a well-type melting furnace divided into two communicating wells: a receiving well for the scrap material and a main holding well for the molten metal. A vaporization chamber over the scrap receiving well collects combustible fumes from the scrap and preheated air for ignition at a burner in the combustion chamber over the main holding well. A large supply of air is provided to the melting furnace through an opening(s) at the top of the vaporization chamber. Special control means are required in the melting furnace of U.S. Pat. No. 3,933,343 to compensate for the excessive amounts of air which might otherwise develop therein, and to maintain the proper fuel-air ratio for complete combustion of the scrap fumes and burner gases. It would be highly desirable if an improved method of melting scrap metal could be found which utilizes a melting furnace having a simple and efficient design and requiring no complex provisions for combustion control, and which does not utilize excess air for combustion, thereby minimizing oxidation of the scrap metal.

OBJECTS OF THE INVENTION

It is therefore an object of the present invention to provide an improved scrap metal melting furnace which is relatively inexpensive in design and construction and is simple and reliable in operation.

It is another object of the present invention to provide an improved method and apparatus for melting metals, especially scrap metals, which yield metals of high purity while significantly reducing oxidation of the metal.

It is still another object of the present invention to provide a method and apparatus for melting metals, especially scrap metals, in which the heat content of the emissions from the metals being heated is utilized in the melting operation.

It is a further object of the invention to provide a melting furnace and method, especially for scrap metals, which are particularly adapted to eliminate polluting emissions to the outside atmosphere from metals which are placed in the furnace to be melted.

It is yet another object of the invention to provide an improved melting furnace and method, especially for scrap metals, in which the exhaust gases are fully burned before being exhausted from the furnace.

It is still a further object of the invention to provide an improved melting furnace and method, especially for scrap metals, in which the amount of thermal energy employed per pound of metal melted is significantly reduced.

It is another object of the invention to provide an improved furnace having a main holding well and an enclosed sidewell, and a method for melting scrap metal therein, in which a high degree of control can be achieved over the amount of air entering into and the rate of fume generation within the sidewell.

Other objects and advantages of the present invention will become apparent to those skilled in the art when the instant disclosure is read in conjunction with the accompanying drawings in which like numerals indicate like elements.

SUMMARY OF THE INVENTION

The above objects have been achieved in the apparatus and method of the invention for recovering metals from metallic scrap material contaminated with combustibles, wherein the metals are melted and the vaporized combustibles generated by the scrap material are utilized in the melting process. More particularly, the reverberatory melting furnace of the invention comprises two communicating wells: one being an enclosed sidewell, which is the receiving well for scrap material during melting, and the other being an enclosed main holding well for molten metal. The main holding well has a main burner port or ports and burner means for admitting fuel and air or oxygen to the interior of the main well through the main burner port or ports. The main well's burner means provides heat to melt the metal and treat the scrap material. Heat from molten material flowing between the main well and the sidewell produces exhaust gases by vaporizing the combustibles of the scrap material.

A passage external to the melting furnace is provided for circulating the exhaust gases from the sidewell to the main well for incineration by the main well's burner means. The circulating passage advantageously comprises an enclosed duct extending from an outlet above the level of the molten metal in the enclosed sidewell to an inlet or inlets into and above the level of the molten metal in the enclosed main holding well. Preferably, the passage's inlet or inlets into the main holding well coincide with said well's main burner port or ports, respectively. The circulating duct can be constructed so as to convey the exhaust gases into the flame path or paths from the burner means. It can also channel said gases directly into and through said burner means before their passage through the main burner port or ports and into the main well, as described in U.S. Pat. No. 3,933,343. If desired, the melting furnace of the invention can be equipped with more than one such circulating passage.

The circulating passage is provided with an eductor means which draws the exhaust gases from the sidewell and increases their flow rate to the main well. Various eductor means can be used, including fans, injector nozzles, etc. In a preferred embodiment, the exhaust gas eduction is effected by a burner means provided for introducing fuel and air or oxygen into the furnace's external circulating passage. This eduction method has the added advantage of providing a preliminary incineration of the exhaust gases. The circulating passage of the invention advantageously includes a venturi portion which is located between the main well's burner port or ports and the eductor means of the circulating passage for causing turbulent mixing of the hot gases in the circulating passage.

The main holding well includes a secondary burner port or ports and one end of the circulating passage is in communication with and interposed between the main burner port or ports and the secondary burner port or ports. The main holding well can be provided with an auxiliary burner or burners for admitting fuel and air or oxygen to the interior of the main well. The auxiliary burner or burners are advantageously designed to fire automatically when the temperature within the main holding well falls below a preselected level adequate to melt the metal and vaporize the scrap combustibles.

The enclosed sidewell, enclosed main holding well and the circulating passage between these two chambers are advantageously constructed to provide a totally enclosed apparatus for melting scrap metal and for treating the polluting emissions therefrom prior to their discharge to the atmosphere. Preferably, each of the enclosed chambers and the circulating passage therebetween are entirely lined with refractory material for coping with the hot environment within the furnace. The unique design of the present melting furnace makes it possible to keep the air or oxygen admission thereto to the minimum amount required for melting of the metal and incineration of the exhaust gases and thus to significantly reduce melt loss arising from oxidation of the metal.

The melting furnace of the invention makes it possible to control to an unprecedented extent the rate of fume generation in the sidewell. The sidewell is entirely enclosed and, in operation, only a limited and controlled entry to its interior is required through the sidewell doors provided for charging and stirring purposes. Except during charging and stirring, the doors are kept closed and a great degree of control is thus achieved over the amount of air admitted to the sidewell. In this way, the rate of fume generation in the sidewell can be controlled and burning within said sidewell can be kept to a minimum.

DESCRIPTION OF THE DRAWINGS

The invention will now be described with reference to the accompanying drawings in which.

DETAILED DESCRIPTION OF THE INVENTION

Figure 1:
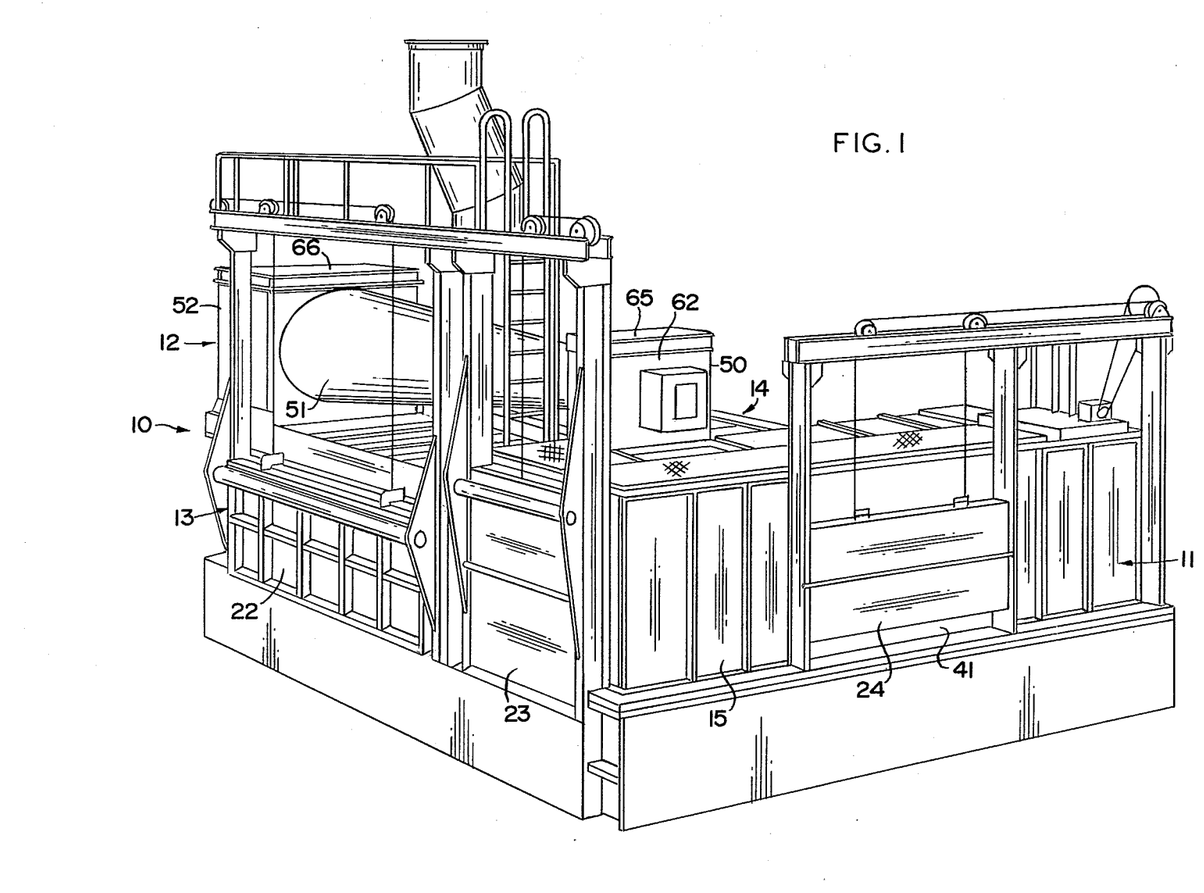
FIG. 1 is a perspective view showing a reverberatory melting furnace according to the present invention.
Figure 2:
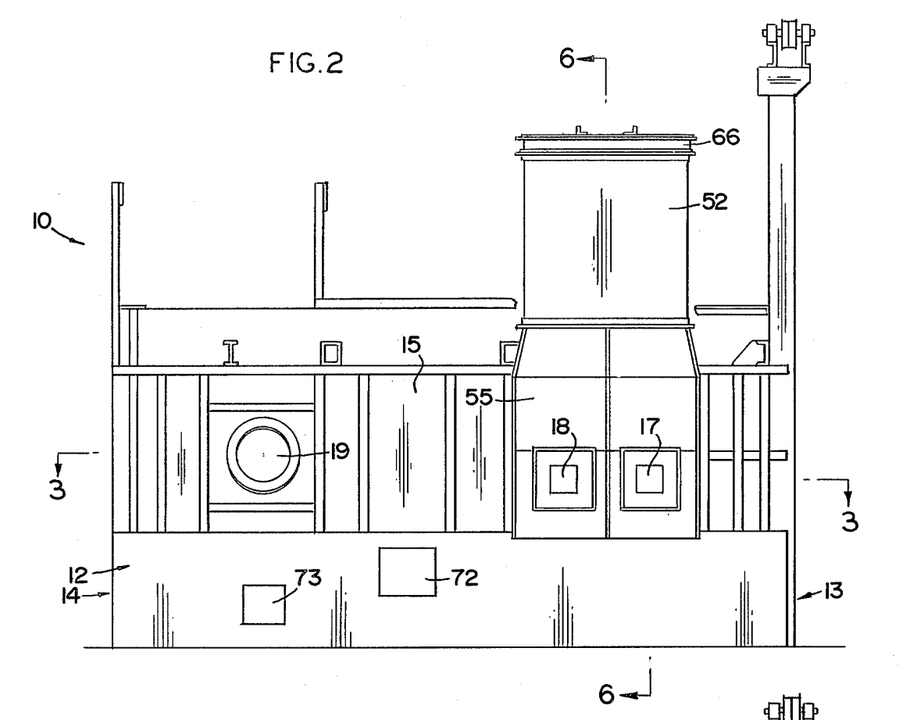
FIG. 2 is an elevational view of the reverberatory melting furnace taken on line 2—2 of FIG. 3.
Figure 3:
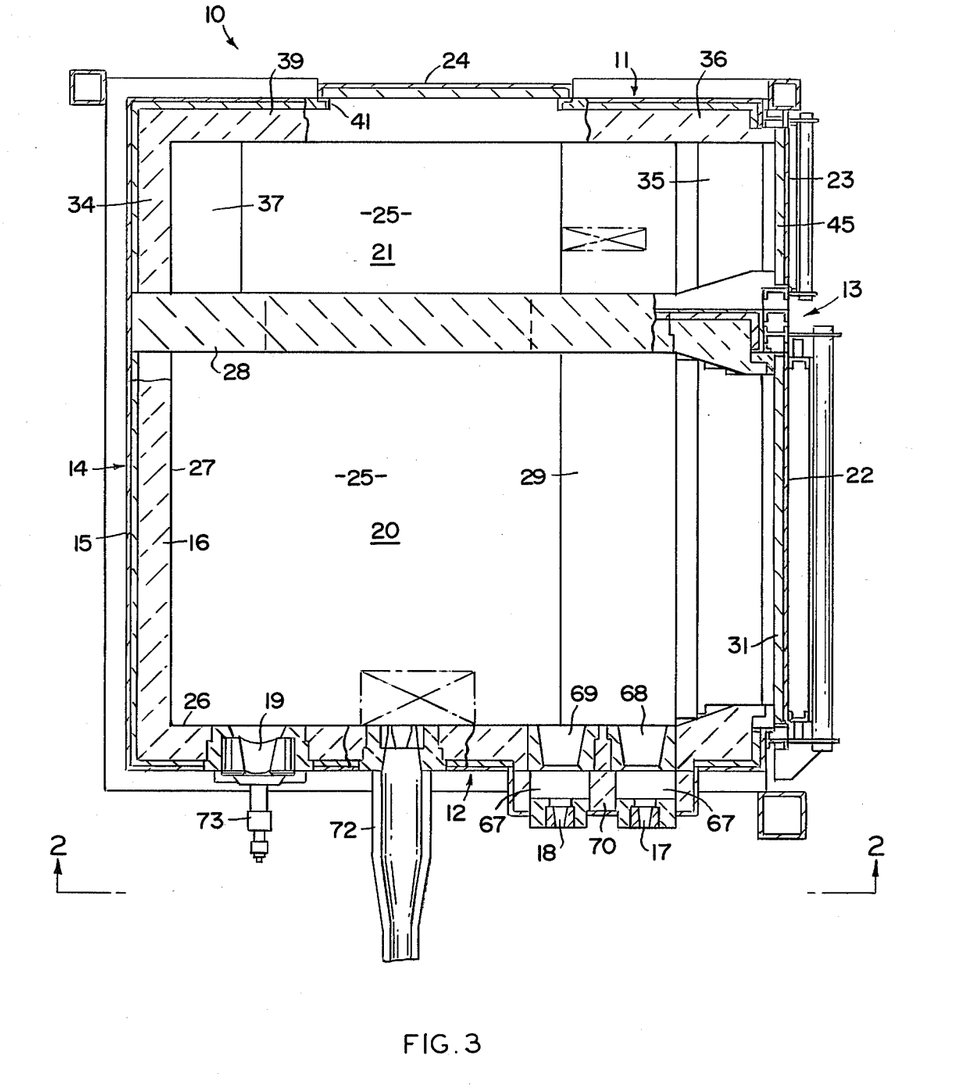
FIG. 3 is a top plan section taken on line 3—3 of FIG. 2.

Referring now more particularly to the drawings, FIG. 1 presents a perspective view of a reverberatory furnace 10 of the present invention having front and rear ends 11 and 12 and sides 13 and 14. The furnace is provided with an outer metallic casing 15 and a lining 16 of refractory material (FIG. 3). Heat insulating material (not shown) of suitable character can advantageously be interposed between the casing and lining. Conventional gas burners (not shown in the drawings) are mounted at burner ports 17, 18, and 19 of rear end 12 (FIG. 2). Furnace 10 is divided into two chambers, a main furnace hearth or holding well 20 and an enclosed sidewell 21, as clearly illustrated in FIGS. 3 and 6. Access can be gained to the interior of main hearth 20 for furnace cleaning and stirring through an opening in furnace side 13, by raising main hearth door 22 by means of the electrically operated pulley arrangement shown in FIG. 1. Furnace side 13 is also provided with an opening to sidewell 21 and is equipped with a door 23 which, upon opening, provides access through said opening to the sidewell interior for stirring and cleanup. Another door 24 (shown partially open in FIG. 1) is located so as to close an opening in furnace front end 11 and provides access, upon opening, to the sidewell for feeding, cleaning, etc. Like door 22, furnace doors 23 and 24 are raised and lowered by means of electrically operated pulley arrangements. Each of doors 22 through 24 rests on a cast iron sill in its fully lowered position. Each of the door edges is suitably encased by cast iron and the doors preferably have an inner refractory lining.

Reference to FIGS. 3–6 will show in more detail the construction of the furnace and the arrangement of the refractory lining about the well sections and circulating passage of the melting furnace. Furnace 10 has a refractory bottom wall on floor 25. Extending over a substantial portion of the floor is main furnace hearth or holding well 20, which has a refractory end wall 26 extending upwardly from one end edge of floor 25, a refractory side wall 27 extending upwardly from one side edge of floor 25, and an interior refractory wall 28, opposed to and spaced the length of main hearth 20 from end wall 26. Vertical side wall 27 extends longitudinally along the respective side edge of floor 25 and abuts wall 26 at one end and wall 28 at the other end. Walls 26 through 28 are of the same height and terminate well above the level of the molten metal in the furnace, said level being represented by the broken line designated M, as indicated clearly in FIGS. 4 and 6 of the drawings.

Figure 4:
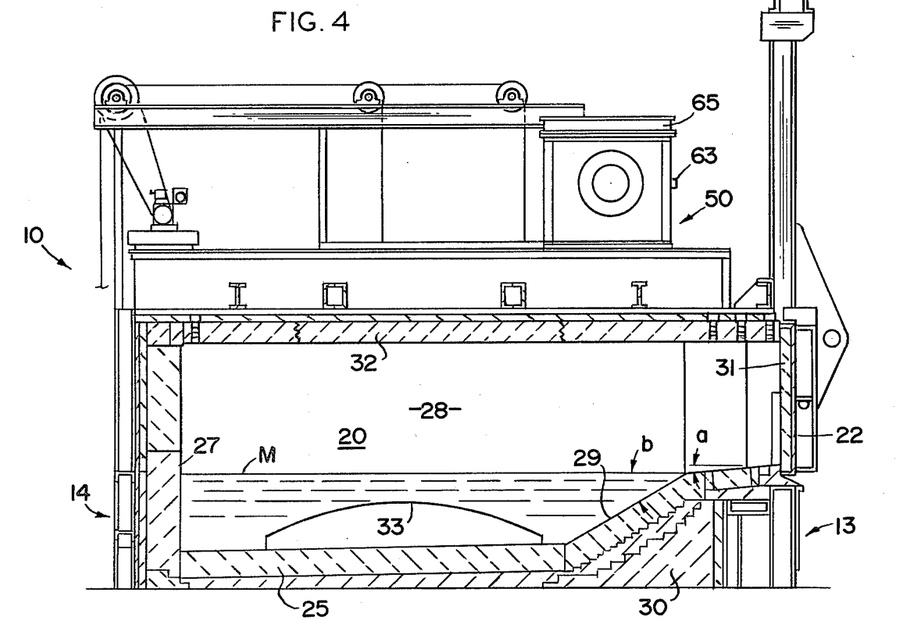
FIG. 4 is a transverse vertical sectional view taken on line 4—4 of FIG. 6.

Extending upwardly from the remaining side edge of floor 25 within main hearth 20 is refractory side wall 29 (FIG. 4). From its upper edge, side wall 29 is inclined downwardly and inwardly at acute angles a and b, as disclosed in FIG. 4. By way of example, acute angles a and b may be 3° and 30° angles, respectively. Support for inclined refractory wall 29 is provided by any suitable structural support 30. The top edge of side wall 29 is at a height which is a fraction of that of the other main hearth enclosing walls 26 through 28, and abuts at its side the inner surface of the lower end of furnace door 22 when said door is in the closed position. (Lining 31 of door 22 is preferably made of a refractory material.) Inclined side wall 29 extends longitudinally along the respective side edge of floor 25 and abuts wall 26 at one end and wall 28 at the other end.

The enclosure of main hearth 20 is completed by an upper, generally rectangular, refractory wall or roof 32, which is secured at three sides over the top edges of walls 26 through 28. The remaining side edge of main hearth upper wall 32 abuts the inner surface of the upper end of door 22 when said door is closed. Closed door 22 becomes sealed shut at its sides by contact of the inner surfaces of its opposed side ends with the respective side edges of walls 26 and 28 and, as noted above, it becomes sealed shut at its top and bottom by contact with upper wall 32 and side wall 29, respectively. In its closed position, door 22 closes off a generally rectangular opening in furnace side 13 extending vertically from the top edge of side wall 29 to the overlying side edge of upper wall 32, and horizontally from end wall 26 to interior wall 28. Wall 28 has an archlike opening 33 (FIG. 4) at the bottom to provide communication between main hearth 20 and sidewell 21. Alternatively, a number of communicating openings can be provided at the bottom of wall 28 in place of single opening 33.

Sidewell 21 is defined by refractory wall 28, two opposed refractory side walls 34 and 35 (FIG. 5), and refractory end wall 36. Side wall 34 extends vertically downwardly from its top edge and at a height somewhat above the surface of the melt in sidewell 21 inclines inwardly and downwardly to terminate at the respective side edge of floor 25. The lower inclined portion 37 of side wall 34 is inclined from the horizontal plane at acute angle c, which may, for example, be a 45° angle. Support for inclined refractory wall portion 37 is provided by any suitable structural support 38. Side wall 34 of the sidewell extends longitudinally along the respective side edge of floor 25 and abuts wall 28 at one end and furnace end wall 36 at the other end.

Figure 5:
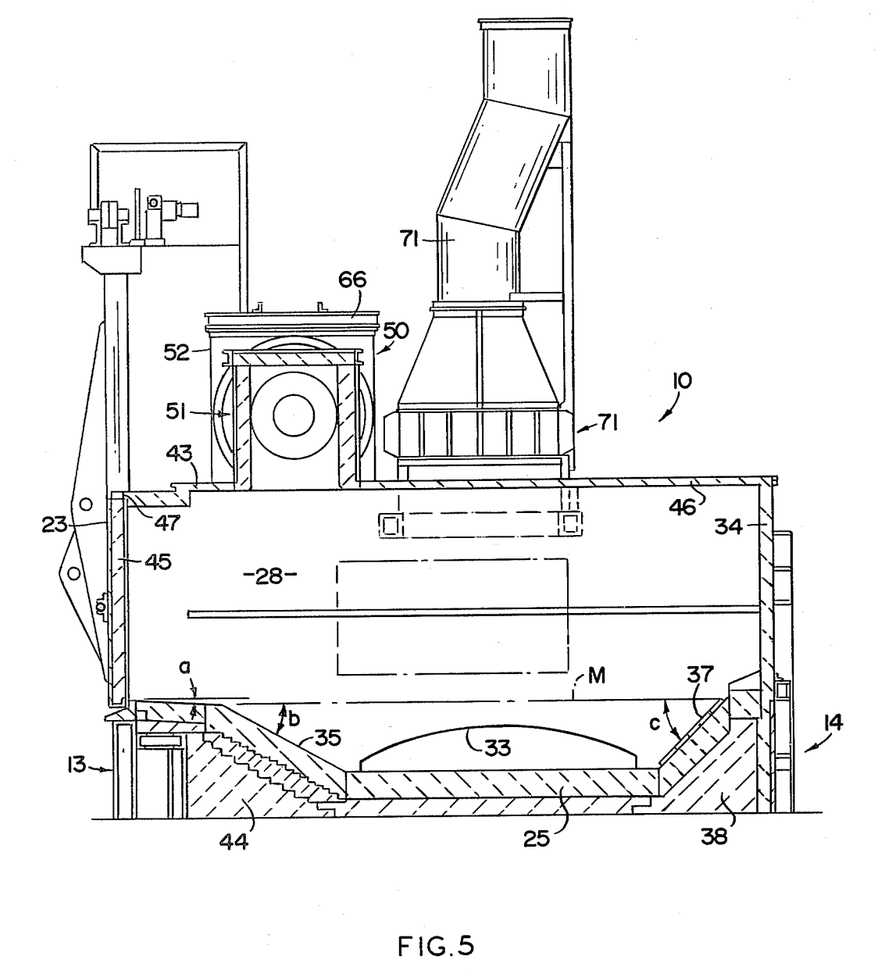
FIG. 5 is a transverse vertical sectional view taken on line 5—5 of FIG. 6.
Figure 6:
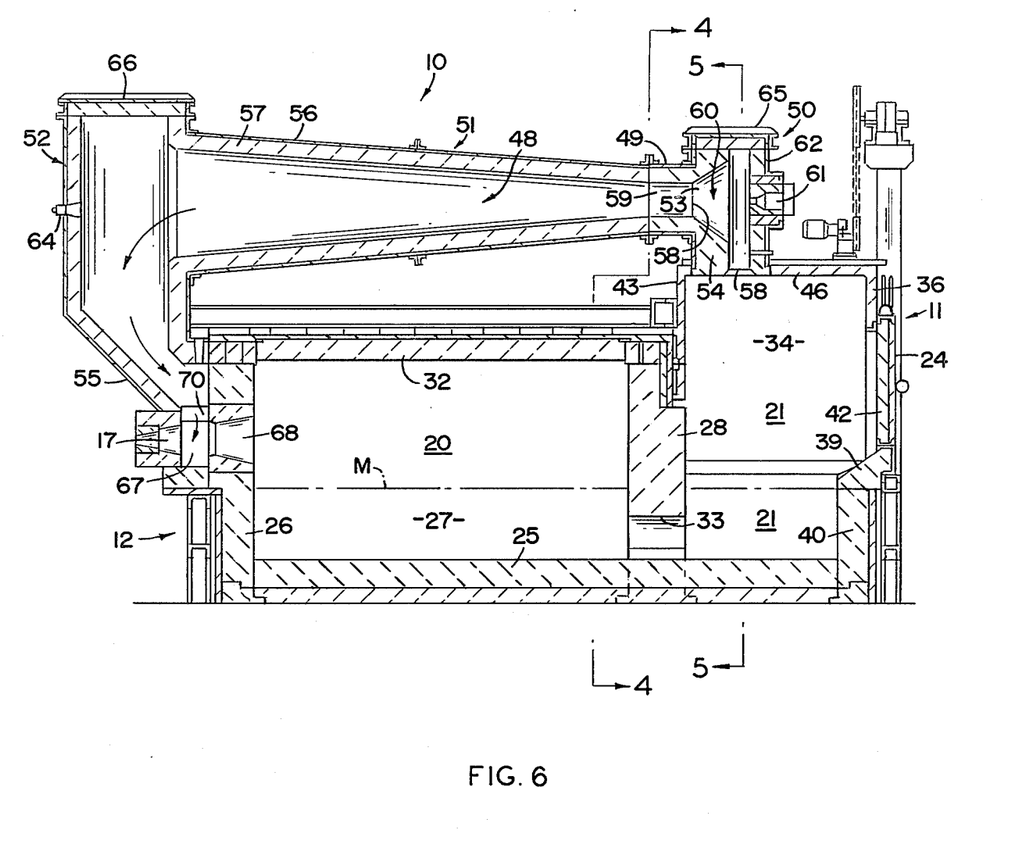
FIG. 6 is a longitudinal vertical sectional view taken on line 6—6 of FIG. 2.

End wall 36 extends vertically downwardly from its top edge and at a height somewhat above the surface of the melt in sidewell 21 inclines inwardly and downwardly for a short section 39, terminating in a lower vertical section 40 (FIG. 6). Access to the sidewell compartment for charging metal scrap thereto can be gained through an opening 41 in end wall 36. The opening and closing of aperture 41 is controlled by raising or lowering sidewell charge door 24, which is mounted adjacent end wall 36. The inner lining 42 of charge door 24 is preferably made of a refractory material. Door 24 is sealed shut in the closed position by contact of the inner surfaces of its upper end and opposed side ends with respective exterior surfaces of wall 36 and of the door lower edge with the upper edge of end wall section 39. End wall 36 extends laterally along the front end edge of floor 25 and abuts side wall 34 at one end and side wall 35 at the other end. Side wall 34 and end wall 36 are of the same height and terminate well above the level of the molten metal in the sidewell, as indicated clearly in FIGS. 5 and 6 of the drawings. Walls 34 and 36 are also somewhat higher than walls 26 through 28 of the furnace. Extending upwardly from the end edge of upper wall 32 which overlies interior wall 28 is a relatively short refractory wall section 43 (FIG. 6). Wall 43 extends from side to side across the furnace and is of the same height as walls 34 and 36.

Extending upwardly from the remaining side edge of floor 25 within sidewell 21 is refractory side wall 35 (FIG. 5). From its upper edge, side wall 35 is inclined downwardly and inwardly at acute angles a and b, as disclosed in FIG. 5. By way of example, acute angles a and b may be 3° and 30° angles, respectively. Support for inclined refractory wall 35 is provided by any suitable structural support 44. The top edge of side wall 35 is at a height which is a fraction of that of the other sidewell enclosing walls 28, 34 and 36, and abuts at its side the inner surface of the lower end of furnace door 23 when said door is in the closed position. Furnace door 23 has an inner lining 45 which is preferably made of a refractory material. Inclined side wall 35 extends longitudinally along the respective side edge of floor 25 and abuts wall 36 at one end and wall 28 at the other end.

The enclosure of sidewell 21 is completed by an upper, generally rectangular, refractory wall or roof 46, which is secured at three sides over the top edges of walls 43, 34 and 36. The remaining side edge 47 of sidewell upper wall 46 abuts the inner surface of the upper end of door 23 when said door is closed. Closed door 23 becomes sealed shut at its sides by contact of the inner surfaces of its opposed side ends with the respective side edge of end wall 36 at one side and the respective side edges of walls 28 and 43 at the other side, and, as noted above, it becomes sealed shut at its top and bottom edges by contact with upper wall 46 and side wall 35, respectively. In its closed position, door 23 closes off a generally rectangular opening in furnace side 13 extending vertically from the top edge of side wall 35 to the overlying side edge 47 of upper wall 46, and horizontally from end wall 36 to walls 28 and 43.

Receiving sidewell 21, into which chamber the metal to be melted is delivered, communicates with main hearth 20 through arch-shaped opening 33 in wall 28. The entire lower portion of furnace 10 adjacent floor 25, wherein molten metal will be contained, forms a unitary melting chamber, which includes the main well 20 and the sidewell 21. Wall 28 completely seals the main hearth off from the sidewell except at its bottom opening 33 below the level of the molten metal. This separation of the main hearth from the sidewell prevents hot gases from coming over from the main hearth to the sidewell and causing ignition in said sidewell.

The melting furnace of the invention includes a hollow, circulating passage 48 (FIG. 6) for the exhaust gases from the scrap metal delivered into the sidewell. Passage 48 extends from sidewell 21 to furnace rear end 12 and thus provides a circulation path for the exhaust gases from the furnace's sidewell to its main hearth. Passage 48 is enclosed by surrounding structure 49, which includes an eductor burner box 50, an intermediate section 51, and a terminal chamber 52. Burner box 50 is a box-like structure mounted on sidewell roof 46. Section 51 extends horizontally from around an opening 53 in one side wall 54 of the burner box and leads to and opens into box-like chamber 52, the lower tapered portion 55 of which registers with an opening through the furnace rear end wall directly above burner ports 17, 18. The circulating passage's encasement 49 is provided with an outer metallic casing 56 and a lining 57 of refractory material. Heat insulating material (not shown) of suitable character can advantageously be interposed between the casing and lining.

Passage 48 includes an outlet port 58 which communicates with sidewell 21 above the level of the molten bath. Outlet 58 through sidewell upper wall 46 is located in the vicinity of the corner formed by sidewell wall section 43 and charging door 23, as can be seen in FIGS. 5 and 6. Passage 48 extends upwardly from sidewell 21 and then makes a 90° turn to the left, as shown in FIG. 6. At the point where circulating passage 48 makes the 90° turn above sidewell 21, the diameter of the passage narrows to form a venturi section 59. Eductor burner box 50 encloses both the upwardly directed section of passage 48 and its narrowing lateral extension 60 leading through box opening 53 to venturi section 59.

Located directly opposite opening 53 of the burner box is burner port 61 in side wall 62 of the burner box. A conventional gas burner (not shown in the drawings) is mounted in burner port 61 so that its flames are directed toward the axial length of the venturi section 59. The burner serves to draw the exhaust gases from the sidewell and to effectuate rapid vapor movement through circulating passage 48.

Another but less effective means which can be used to propel the exhaust gases in the circulating passage towards the main burner port(s) is disclosed in U.S. Pat. No. 4,055,334, the disclosures of which are incorporated herein by reference. In accordance with U.S. Pat. No. 4,055,334, an eductor nozzle is mounted so as to penetrate through side wall 62 and be directed down the axial length of the venturi section. Air forced through the eductor nozzle by a combustion blower is jetted downstream through the venturi portion.

Circulating passage 48 extends within surrounding section 51 from eductor burner box 50 to chamber 52, passing over the main hearth roof 32. The cross-sectional area of passage 48 gradually increases from venturi section 59 to chamber 52. The circulation passage can be viewed through an observation port 63 (FIG. 4) in one of the burner box side walls and a second observation port 64 (FIG. 6) in one of the side walls of chamber 52. Removable lids 65 and 66 are provided at the tops of the eductor burner box 50 and chamber 52, respectively, to permit access to the latter two chambers.

After passing through intermediate section 51, circulating passage 48 makes a 90° turn and extends downwardly within chamber 52, and then inclines inwardly within tapered chamber portion 55 toward main hearth rear wall 26. The passage ends in a stub portion 67 located exteriorly of wall 26 and interiorly of burner ports 17 and 18. The path of the exhaust gases within passage 48 is shown by arrows in FIG. 6. Stub portion 67 communicates with the interior of furnace main hearth 20 through side by side secondary burner ports or openings 68 and 69 through rear wall 26. Each of ports 68 and 69 has a circular cross section which, proceeding from the exterior to the interior of wall 26, first gradually lessens in area for a short distance and then gradually increases in area for the remaining greater distance to the hearth interior, as shown in FIGS. 3 and 6. The stub portion 67 also communicates with main burner ports 17 and 18, which are located to the exterior of the stub portion and just below tapered chamber portion 55. At the point where the exhaust gases pass downwardly and inwardly from chamber 52 into stub portion 67, they are separated into two streams by bridging structure 70, which extends from the adjoining lower end of the exterior wall of chamber section 55 to main hearth rear wall 26 and divides in two the upper part of stub portion 67. Each of the main burner ports is directly opposed to its respective secondary burner port across stub portion 67 so that the flames from the main burners are jetted across stub portion 67 to the secondary burner ports. In passing through stub portion 67, the burning fuel combines with the hot exhaust gases from circulating passage 48 and is thereafter forced out through the secondary burner ports 68 and 69 into the main hearth chamber. It will be apparent that a single main burner or a number of main burners greater than two, together with the corresponding burner ports, could be employed, if desired. The exhaust gases are exhausted from main hearth 20 by a conventional exhaust stack 71.

An auxiliary burner 19, of conventional design, is mounted within an opening in main hearth rear wall 26 such that its flames are directed over the molten metal in the furnace. Burner 19 is supplied with natural gas or other fuel in a conventional manner. It is set to fire automatically in response to a signal generated by a sensor positioned to monitor the temperature within main hearth 20. If the temperature within the main hearth drops below a preselected level adequate to melt the metal, burner 19 will fire until the appropriate temperature is again reached.

The processing of the contaminated scrap is begun by initially depositing a predetermined amount of metal in either molten or solid state within the furnace and heating the material to its melting temperature by operating burners 17 and 18 in the conventional manner with a natural gas or similar fuel. A pool of molten metal is thus established within main hearth 20 and sidewell 21, flowing between the two chambers via opening 33. Subsequently, contaminated scrap material is initially fed into sidewell 21. At the same time, the temperature within main hearth 20 is raised to a preselected level adequate to melt the metal constituents of the scrap, and to ignite any combustible or hydrocarbon constituents as well.

However, before the scrap is melted, it first must rest in sidewell 21, whose temperature is generally lower than that of the main hearth 20, being established by convection from the heated material in hearth 20 through opening 33. Although the temperature is too low for the ignition of the combustibles, it is at a high enough level to vaporize the combustible or hydrocarbon constituents of the scrap. The burner of circulating passage 48 establishes a suction therethrough, with the result that the exhaust gases are propelled towards the main burner ports.

The melting of the metal constituents in sidewell 21 can be aided by occasional mixing of the mass therein. As the melting proceeds, the scrap originally placed in sidewell 21 is melted and eventually finds its way into main hearth 20 through opening 33. Meanwhile, the fumes driven off the scrap into the upper part of the sidewell chamber are forced into circulating passage 48 by the negative pressure generated by the circulating passage's burner. This burner then forces the fumes through the circulating passage and to the main burner ports, where they are mixed with the burning fuel from the burners and ignited.

During the melting process, the motor operated doors to the sidewell are carefully controlled to limit the amount of air that can enter therein. For example, where very contaminated scrap is being worked, the opening of these doors must be kept to a minimum. With its doors closed, the sidewell of the invention constitutes a very tight enclosure, which minimizes the amount of air that can enter the sidewell and support combustion.

The type of scrap metal being melted will naturally affect the amount to be added at any one time and the rate of addition. Care should be taken that so much scrap is not put into the sidewell as to cause excessive fumes and smoke in the sidewell and thus overload the furnace. To charge the furnace, sidewell door 24 is opened. The scrap is dumped in, the dumper is retracted, and the door is closed. Thereafter, sidewell door 23 is opened for inspection. If there is an adequate development of smoke within the sidewell, the door is closed and the process is allowed to continue. If there is very little smoke generation, a stirring tool is briefly employed to stir the sidewell contents and then the tool is removed and door 23 is closed.

Door 22 gives good access to the main hearth for charging large pieces of solid aluminum, such as ingot and sow, and for stirring in the main hearth to bring about good heat transfer between the main hearth and the sidewell. The heat transfer through the molten metal, brought about by this stirring and the stirring in the sidewell, contributes to the attainment of the furnace's highly efficient melt rate.

A tap 72 is provided in rear wall 26 of the furnace for the discharge of molten metal to a holding hearth when melting and mixing are completed. Rear wall 26 is also provided with a drain 73 for use when all the molten metal is to be removed from the furnace, as, e.g., for cleaning purposes.

The furnace of the invention has a number of advantageous features. Like the recycling furnace of U.S. Pat. No. 4,055,334, it utilizes the heat content of the exhaust gases from the scrap metal in the melting operation by combining the exhaust gases with the burner fuel from the main burner port(s). Also, the charge contaminants are pulled from the furnace sidewell through circulating passage 48 and the secondary burner ports 68 and 69 and are consumed as furnace fuel, thus obviating the necessity for a costly after-burner and additional fuel for incineration. However, unlike the recycling system of U.S. Pat. No. 4,055,334, the present furnace achieves an efficient utilization of the heat energy of the exhaust gases without recirculating these gases over the charge before exhausting them from the furnace.

The present invention provides a uniquely designed reverberatory melting furnace for aluminum scrap which has an enclosed sidewell, with suitable access doors in the sidewell for charging scrap and working the metal. Aluminum scrap cannot be melted in an open sidewell without some pollution control equipment which conventionally is an expensive bag house collection system. The enclosed sidewell of the invention obviates the need for this expensive arrangement. It constitutes a simple but effective containing chamber for the smoke and fumes resulting from the scrap melting process. The smoke and fumes flow from the sidewell to the furnace's enclosed main hearth via the enclosed circulating passage. Because it is completely enclosed, the furnace can be operated without excessive air infiltration by suitably regulating the air admitted through the sidewell doors, and the air or oxygen supplied by the furnace's burner(s) or other devices such as an eductor nozzle, fan, etc. Through its careful control of the amount of air or oxygen passing into the furnace, the present invention avoids to a great extent burning or oxidation of the metal.

Whereas the present invention has been described with respect to specific embodiments thereof, it should be understood that the invention is not limited thereto, as many modifications thereof may be made. It is, therefore, contemplated to cover by the present application any and all such modifications as fall within the true spirit and scope of the appended claims.

We claim:

1. A melting furnace for reclaiming metals from metallic scrap material contaminated with combustibles comprising:
   (a) an enclosed first chamber, the lower portion of which is a well for containing scrap material and molten metal, said first chamber having at least one outlet above the level of said molten metal for exhaust gases from said scrap material;
   (b) an enclosed second chamber, the lower portion of which is a well for containing molten metal, said second chamber having
      (i) at least one main burner port, and a main burner means associated with said main burner port for establishing a flame path through said main burner port and over said molten metal in said second chamber, and
      (ii) an exhaust opening;
   (c) means connecting said first chamber to said second chamber so that said molten metal in said first and second chambers can flow therebetween; and
   (d) a circulating means associated with said first chamber outlet and external to said first and second chambers for circulating said exhaust gases from said first chamber outlet to said enclosed second chamber for incineration of said gases by said main burner means before their discharge through said exhaust opening.

2. The melting furnace of claim 1 wherein said circulating means comprises an enclosed circulating passage for circulating said exhaust gases from said first chamber outlet to said main burner port, said circulating passage having an eductor means for propelling said exhaust gases in said circulating passage towards said main burner port.

3. The melting furnace of claim 2 wherein an eductor burner port is provided in said circulating passage and said eductor means comprises a burner means for establishing a flame path through said eductor burner port and within said circulating passage to incinerate said exhaust gases and propel said gases within said passage towards said main burner port.

4. The melting furnace of claims 2 or 3 wherein said circulating passage includes a venturi portion located between said main burner port and said eductor means for propelling said exhaust gases in said circulating passage towards said main burner port.

5. The melting furnace of claim 4 wherein said second chamber includes at least one secondary burner port and one end of said circulating passage is in communication with and interposed between said main burner port and said secondary burner port such that the burning fuel from said main burner means combines with said circulated exhaust gases and is then introduced into said second chamber through said secondary burner port.

6. The melting furnace of claim 5 wherein said first and second chambers are separated by a common wall and said means connecting said chambers comprises at least one opening through a bottom portion of said common wall and below the level of said molten metal in said chambers, whereby communication is permitted between said lower well portions of said chambers for the transmission of heat by convection through said molten metal from said second chamber to said first chamber to cause vaporization of the combustibles within said first chamber.

7. The melting furnace of claim 1 wherein said second chamber is further equipped with at least one auxiliary burner means adapted to automatically establish a flame path over said molten metal in said second chamber when the temperature within said second chamber drops below a preselected level adequate to melt said metal.

8. The melting furnace of claim 2 wherein said main burner means is secured within a corresponding main burner port and said circulating passage channels said exhaust gases directly into and through said main burner means and then into said second chamber.

9. A method of reclaiming metal from metal-bearing scrap material contaminated with combustibles which comprises the steps of:
(a) feeding said scrap material into an enclosed first chamber, the lower portion of which is a well for containing said scrap material and molten metal, said first chamber having at least one outlet above the level of said molten metal for exhaust gases from said scrap material;
(b) heating an enclosed second chamber to a temperature sufficient to
(i) melt said scrap material and form a molten metal pool in the lower portion of said second chamber, said first and second chambers being connected so that said molten metal in said chambers can flow therebetween, and
(ii) vaporize the scrap combustibles to produce said exhaust gases in said first chamber;
(c) circulating said exhaust gases from said first chamber outlet to said second chamber; and
(d) incinerating said exhaust gases from said first chamber by at least one main burner means of said second chamber, thereby utilizing said exhaust gases in melting said scrap material.

10. The method of claim 9 wherein said exhaust gases are circulated from said first chamber to said second chamber through an enclosed circulating passage extending from said first chamber outlet to at least one main burner port of said second chamber, said main burner means being associated with a main burner port and being located to establish a flame path through said corresponding main burner port and over said molten metal in said second chamber, and said circulating passage having an eductor means for propelling said exhaust gases in said circulating passage towards said main burner port.

11. The method of claim 10 wherein an eductor burner port is provided in said circulating passage and said eductor means comprises a burner means for establishing a flame path through said eductor burner port and within said curculating passage to incinerate said exhaust gases and propel said gases within said passage towards said main burner port.

12. The method of claims 10 or 11 wherein said circulating passage includes a venturi portion located between said main burner port and said eductor means for propelling said exhaust gases in said circulating passage towards said main burner port.

13. The method of claim 12 wherein said second chamber includes at least one secondary burner port and one end of said circulating passage is in communication with and interposed between said main burner port and said secondary burner port such that the burning fuel from said main burner means combines with the circulated exhaust gases and is then introduced into said second chamber through said secondary burner port.

14. The method of claim 13 wherein said first and second chambers are separated by a common wall, and said chambers are connected to each other by at least one opening through a bottom portion of said common wall and below the level of said molten metal in said chambers, whereby communication is permitted between said lower well portions of said chambers for the transmission of heat by convection through said molten metal from said second chamber to said first chamber to cause vaporization of the combustibles within said first chamber.

15. The method of claim 9 wherein said second chamber is further equipped with at least one auxiliary burner means adapted to automatically establish a flame path over said molten metal in said second chamber when the temperature within the second chamber drops below a preselected level adequate to melt said metal.

16. The method of claim 10 wherein said main burner means is secured within a corresponding main burner port and said circulating passage channels said exhaust gases directly into and through said main burner means and then into said second chamber.

* * * * *